(12) United States Patent
Ye

(10) Patent No.: US 10,440,608 B2
(45) Date of Patent: Oct. 8, 2019

(54) METHOD AND APPARATUS FOR DOWNLINK AND UPLINK COMPRESSION OF NONSTANDARD BANDWIDTH OF LTE SYSTEM

(71) Applicant: Huawei Technologies Co., Ltd., Shenzhen, Guangdong (CN)

(72) Inventor: Jiyu Ye, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/812,984

(22) Filed: Nov. 14, 2017

(65) Prior Publication Data

US 2018/0070267 A1 Mar. 8, 2018

Related U.S. Application Data

(63) Continuation of application No. PCT/CN2015/079045, filed on May 15, 2015.

(51) Int. Cl.
*H04W 28/06* (2009.01)
*H04W 16/00* (2009.01)
(Continued)

(52) U.S. Cl.
CPC .............. *H04W 28/06* (2013.01); *H04B 1/66* (2013.01); *H04L 27/2601* (2013.01);
(Continued)

(58) Field of Classification Search
CPC ... H04B 1/02; H04B 1/04; H04B 1/06; H04B 1/16; H04B 1/66; H04L 5/0098; H04L 27/12; H04L 27/14; H04L 27/2601; H04L 27/2626; H04L 27/2627; H04L 27/2647; H04L 27/2649; H04L 69/04; H04W 16/00; H04W 16/14; H04W 72/0413; H04W 72/042; H04W 28/06
USPC ....... 375/259, 260, 262, 265, 267, 268, 271, 375/272, 278, 300, 302–304, 320, 322, 375/324, 334, 340; 370/310.2, 328, 343; 455/456.5, 456.6, 500, 502, 108, 110
See application file for complete search history.

(56) References Cited

U.S. PATENT DOCUMENTS 5,613,234 A * 3/1997 Vella-Coleiro ........ H03D 7/163
455/137
7,155,189 B2 * 12/2006 Zumkeller ........... H04B 1/1036
455/260
(Continued)

FOREIGN PATENT DOCUMENTS

| CN | 101247140 A | 8/2008 |
| CN | 102045865 A | 5/2011 |

(Continued)

*Primary Examiner* — Young T Tse
(74) *Attorney, Agent, or Firm* — Leydig, Voit & Mayer, Ltd.

(57) ABSTRACT

Embodiments of the present disclosure provide a method and an apparatus for downlink and uplink compression of a nonstandard bandwidth of an LTE system. A base station filters a baseband signal by using a filter whose bandwidth is a nonstandard bandwidth of LTE, and filters out a signal outside the nonstandard bandwidth of LTE; and the base station may send a signal to a terminal by using the nonstandard bandwidth of LTE that can be provided by an operator.

16 Claims, 4 Drawing Sheets

(51) Int. Cl.
  *H04W 72/04* (2009.01)
  *H04B 1/66* (2006.01)
  *H04L 27/26* (2006.01)
  *H04L 29/06* (2006.01)
  *H04W 16/14* (2009.01)
  *H04L 5/00* (2006.01)

(52) U.S. Cl.
  CPC ......... *H04W 16/00* (2013.01); *H04W 72/042* (2013.01); *H04W 72/0413* (2013.01); *H04L 5/0098* (2013.01); *H04L 69/04* (2013.01); *H04W 16/14* (2013.01)

(56) References Cited

U.S. PATENT DOCUMENTS

| | | | | |
|---|---|---|---|---|
| 7,734,274 | B2* | 6/2010 | Hayden | H04B 1/1036 375/229 |
| 2009/0147735 | A1 | 6/2009 | Ghosh et al. | |
| 2011/0299433 | A1* | 12/2011 | Darabi | H04B 1/525 370/277 |
| 2012/0270585 | A1 | 10/2012 | Feng et al. | |
| 2013/0070625 | A1* | 3/2013 | Fujishima | H04W 36/20 370/252 |
| 2014/0126498 | A1 | 5/2014 | Koorapaty et al. | |

FOREIGN PATENT DOCUMENTS

| | | |
|---|---|---|
| CN | 102300267 A | 12/2011 |
| CN | 102724149 A | 10/2012 |
| WO | 2011082548 A1 | 7/2011 |

* cited by examiner

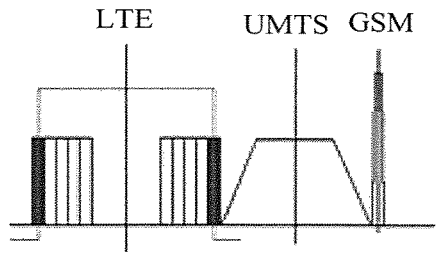

FIG. 1

(Prior Art)

```
┌─────────────────────────────────────────────────────┐
│ A base station shifts a center frequency of a       │
│ baseband signal to a preset direction by a          │
│ frequency change amount of a preset size,           │   101
│ where the frequency change amount is preset         │
└─────────────────────────────────────────────────────┘
                          │
                          ▼
┌─────────────────────────────────────────────────────┐
│ The base station filters the frequency-shifted      │
│ baseband signal by using a filter, to filter out an │
│ edge signal of the frequency-shifted baseband       │
│ signal on a side of the preset direction, where a   │
│ center frequency of the filter is the same as the   │   102
│ center frequency of the baseband signal, a          │
│ bandwidth of the filter is a nonstandard            │
│ bandwidth of an LTE system, and the nonstandard     │
│ bandwidth of the LTE system is less than a          │
│ standard bandwidth of the LTE system                │
└─────────────────────────────────────────────────────┘
                          │
                          ▼
┌─────────────────────────────────────────────────────┐
│ The base station performs frequency conversion      │
│ processing on the filtered baseband signal to       │
│ obtain an intermediate frequency signal; and        │
│ shifts a center frequency of the intermediate       │
│ frequency signal to an opposite direction of the    │   103
│ preset direction by the frequency change amount     │
│ of a preset size, where a center frequency of the   │
│ frequency-shifted intermediate frequency signal     │
│ is the same as the center frequency of the          │
│ baseband signal                                     │
└─────────────────────────────────────────────────────┘
                          │
                          ▼
┌─────────────────────────────────────────────────────┐
│ The base station performs frequency conversion      │
│ processing on the frequency-shifted intermediate    │
│ frequency signal to obtain a radio frequency        │
│ signal, and sends the radio frequency signal to a   │   104
│ terminal, where a bandwidth of the radio            │
│ frequency signal is the nonstandard bandwidth of    │
│ the LTE                                             │
└─────────────────────────────────────────────────────┘
```

FIG. 2

METHOD AND APPARATUS FOR DOWNLINK AND UPLINK COMPRESSION OF NONSTANDARD BANDWIDTH OF LTE SYSTEM

CROSS-REFERENCE TO RELATED APPLICATIONS

This application is a continuation of International Application No. PCT/CN2015/079045, filed on May 15, 2015, the disclosure of which is hereby incorporated by reference in its entirety.

TECHNICAL FIELD

Embodiments of the present application relate to communications technologies, and in particular, to a method and an apparatus for downlink and uplink compression of a nonstandard bandwidth of a Long Term Evolution (LTE) system.

BACKGROUND

Refarming refers to re-planning of a spectrum resource, and generally means that a lower-standard system spares a spectrum band for a higher-standard system. For example, GL Refarming means that a Global System for Mobile Communications (GSM) system spares a spectrum band for an LTE system. By using an 850M/900M spectrum as an example, 850M/900M is originally provided for the GSM system to use, and to improve deep coverage of the LTE system, an operator spares a part of spectrums of the GSM system for the LTE system. Because existing spectrum resources are limited, the operator cannot provide a standard bandwidth for the LTE system. For example, the LTE system uses a standard 5M bandwidth, but the operator can provide only a 4.4M or 4.6M nonstandard bandwidth. A standard bandwidth of the LTE system is 1.4M, 3M, 5M, 10M, 15M, or 20M.

To enable the nonstandard bandwidth provided by the operator to be used in the LTE system, a transition band or a resource block (RB) of a spectrum is compressed in the prior art. By using a 4.6M nonstandard bandwidth as an example, a solution in the prior art is to use a 4.6M symmetric filter to filter a 5M bandwidth. As shown in FIG. 1, FIG. 1 is a spectrum compression solution in the prior art in which a 4.6M symmetric filter is used to perform symmetric filtering on a signal, and one RB is filtered out (black in FIG. 1 represents the RB that is filtered out) at each of two ends of a spectrum. By using a filter, a signal at a frequency outside a bandwidth of the filter is filtered out, and a bandwidth of a signal actually sent by a base station is 4.6M.

In the solution of the prior art, half an RB is filtered out at each of two ends of a spectrum by means of symmetric filtering, which makes two RBs unusable. Therefore, according to an existing technical solution, a waste of spectrum resources is caused.

SUMMARY

Embodiments of the present disclosure provide a method and an apparatus for downlink and uplink compression of a nonstandard bandwidth of an LTE system, which can improve utilization of spectrum resources.

A first aspect of the present disclosure provides a base station, including:

at least one processor, configured to shift a center frequency of a baseband signal to a preset direction by a frequency change amount, where the frequency change amount is preconfigured;

a filter, configured to filter the frequency-shifted baseband signal to filter out an edge signal of the frequency-shifted baseband signal on a side of the preset direction, where a center frequency of the filter is the same as the center frequency of the baseband signal, a bandwidth of the filter is a nonstandard bandwidth of a Long Term Evolution LTE system, and the nonstandard bandwidth of the LTE system is less than a standard bandwidth of the LTE system; where the at least one processor is further configured to perform frequency conversion processing on the baseband signal filtered by the filter, to obtain an intermediate frequency signal; and shift a center frequency of the intermediate frequency signal to an opposite direction of the preset direction by the frequency change amount, where a center frequency of the frequency-shifted intermediate frequency signal is the same as the center frequency of the baseband signal; and the at least one processor is further configured to perform frequency conversion processing on the frequency-shifted intermediate frequency signal to obtain a radio frequency signal; and a transmitter, configured to send the radio frequency signal to a terminal, where a bandwidth of the radio frequency signal is the nonstandard bandwidth of the LTE.

With reference to the first aspect, in a first possible implementation manner of the first aspect, the frequency change amount is a size of N resource blocks, where N is greater than 0.

With reference to the first aspect, in a second possible implementation manner of the first aspect, the frequency change amount is a size of N guard bands of the standard bandwidth of the LTE system, where N is greater than 0.

With reference to the first aspect and either of the first to the second possible implementation manners of the first aspect, in a third possible implementation manner of the first aspect, the transmitter is further configured to:

send the nonstandard bandwidth of the LTE system to the terminal, so that the terminal sends data to the base station according to the nonstandard bandwidth of the LTE system.

A second aspect of the present disclosure provides a base station, including:

a receiver, configured to receive a radio frequency signal sent by a terminal, where the radio frequency signal is sent by the terminal to the base station according to a nonstandard bandwidth of a Long Term Evolution LTE system;

at least one processor, configured to shift a center frequency of the radio frequency signal received by the receiver to a preset direction by a frequency change amount, where the frequency change amount is preconfigured; and a filter, configured to filter the frequency-shifted radio frequency signal to filter out an edge signal of the frequency-shifted radio frequency signal on a side of the preset direction, where a center frequency of the filter is the same as the center frequency of the radio frequency signal, a bandwidth of the filter is the nonstandard bandwidth of the LTE system, and the nonstandard bandwidth of the LTE system is less than a standard bandwidth of the LTE system; where the at least one processor is further configured to perform frequency conversion processing on the radio frequency signal filtered by the filter, to obtain an intermediate frequency signal; and shift a center frequency of the intermediate frequency signal to an opposite direction of the preset direction by the frequency change amount, where a center frequency of the frequency-shifted intermediate frequency signal is the same as the center frequency of the radio frequency signal; and the at least one processor is further configured to perform frequency conversion processing on the frequency-shifted intermediate frequency signal to obtain a baseband signal.

With reference to the second aspect, in a first possible implementation manner of the second aspect, the frequency change amount is a size of N resource blocks, where N is greater than 0.

With reference to the second aspect, in a second possible implementation manner of the second aspect, the frequency change amount is a size of N guard bands of the standard bandwidth of the LTE system, where N is greater than 0.

With reference to the second aspect and either of the first to the second possible implementation manners of the second aspect, in a third possible implementation manner of the second aspect, the base station further includes:

a transmitter, configured to send the nonstandard bandwidth of the LTE system to the terminal, so that the terminal sends data to the base station according to the nonstandard bandwidth of the LTE system.

A third aspect of the present disclosure provides a method for downlink compression of a nonstandard bandwidth of an LTE system, including:

shifting, by a base station, a center frequency of a baseband signal to a preset direction by a frequency change amount, where the frequency change amount is preconfigured;

filtering, by the base station, the frequency-shifted baseband signal by using a filter, to filter out an edge signal of the frequency-shifted baseband signal on a side of the preset direction, where a center frequency of the filter is the same as the center frequency of the baseband signal, a bandwidth of the filter is a nonstandard bandwidth of a Long Term Evolution LTE system, and the nonstandard bandwidth of the LTE system is less than a standard bandwidth of the LTE system;

performing, by the base station, frequency conversion processing on the filtered baseband signal to obtain an intermediate frequency signal; and shifting a center frequency of the intermediate frequency signal to an opposite direction of the preset direction by the frequency change amount, where a center frequency of the frequency-shifted intermediate frequency signal is the same as the center frequency of the baseband signal; and performing, by the base station, frequency conversion processing on the frequency-shifted intermediate frequency signal to obtain a radio frequency signal, and sending the radio frequency signal to a terminal, where a bandwidth of the radio frequency signal is the nonstandard bandwidth of the LTE.

With reference to the third aspect, in a first possible implementation manner of the third aspect, the frequency change amount is a size of N resource blocks, where N is greater than 0.

With reference to the third aspect, in a second possible implementation manner of the third aspect, the frequency change amount is a size of N guard bands of the standard bandwidth of the LTE system, where N is greater than 0.

With reference to the third aspect and either of the first to the second possible implementation manners of the third aspect, in a third possible implementation manner of the third aspect, the method further includes:

sending, by the base station, the nonstandard bandwidth of the LTE system to the terminal, so that the terminal sends data to the base station according to the nonstandard bandwidth of the LTE system.

A fourth aspect of the present disclosure provides a method for uplink compression of a nonstandard bandwidth of an LTE system, including:

receiving, by a base station, a radio frequency signal sent by a terminal, where the radio frequency signal is sent by the terminal to the base station according to a nonstandard bandwidth of an LTE system;

shifting, by the base station, a center frequency of the radio frequency signal to a preset direction by a frequency change amount, where the frequency change amount is preconfigured;

filtering, by the base station, the frequency-shifted radio frequency signal by using a filter, to filter out an edge signal of the frequency-shifted radio frequency signal on a side of the preset direction, where a center frequency of the filter is the same as the center frequency of the radio frequency signal, a bandwidth of the filter is the nonstandard bandwidth of the LTE system, and the nonstandard bandwidth of the LTE system is less than a standard bandwidth of the LTE system;

performing, by the base station, frequency conversion processing on the filtered radio frequency signal to obtain an intermediate frequency signal; and shifting a center frequency of the intermediate frequency signal to an opposite direction of the preset direction by the frequency change amount, where a center frequency of the frequency-shifted intermediate frequency signal is the same as the center frequency of the radio frequency signal; and performing, by the base station, frequency conversion processing on the frequency-shifted intermediate frequency signal to obtain a baseband signal.

With reference to the fourth aspect, in a first possible implementation manner of the fourth aspect, the frequency change amount is a size of N resource blocks, where N is greater than 0.

With reference to the fourth aspect, in a second possible implementation manner of the fourth aspect, the frequency change amount is a size of N guard bands of the standard bandwidth of the LTE system, where N is greater than 0.

With reference to the fourth aspect and either of the first to the second possible implementation manners of the fourth aspect, in a third possible implementation manner of the fourth aspect, the method further includes:

sending, by the base station, the nonstandard bandwidth of the LTE system to the terminal, so that the terminal sends data to the base station according to the nonstandard bandwidth of the LTE system.

A fifth aspect of the present disclosure provides a communications system, including:

a base station, configured to execute the method according to the first aspect of the present disclosure and anyone of the first to the third possible implementation manners of the first aspect; and a terminal, configured to receive a radio frequency signal sent by the base station, where a bandwidth of the radio frequency signal is a nonstandard bandwidth of an LTE system.

A sixth aspect of the present disclosure provides a communications system, including:

a terminal, configured to send a radio frequency signal to a base station, where the radio frequency signal is sent by the terminal to the base station according to a nonstandard bandwidth of a Long Term Evolution LTE system; and the base station, configured to execute the method according to the second aspect of the present disclosure and any one of the first to the third possible implementation manners of the second aspect.

According to the method and the apparatus for downlink and uplink compression of a nonstandard bandwidth of an LTE system provided in the embodiments of the present disclosure, abase station filters a baseband signal by using a filter whose bandwidth is a nonstandard bandwidth of LTE, and filters out a signal outside the nonstandard bandwidth of LTE; and the base station may send a signal to a terminal by using the nonstandard bandwidth of LTE that can be provided by an operator. For example, the operator can provide only an LTE nonstandard bandwidth of 3M that falls within 1-4M, and a standard bandwidth of LTE is 5M, and therefore, the filter needs to filter out signals within bandwidths 0-1M and 4-5M. During final sending, the base station uses the LTE nonstandard bandwidth of 3M; during receiving, the terminal uses the LTE standard bandwidth of 5M for receiving; and the base station has no signal within bandwidths 0-1M and 4-5M. The base station also needs to send the nonstandard bandwidth of the LTE system to the terminal, so that the terminal sends data to the base station according to the nonstandard bandwidth of the LTE system.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

FIG. 1 is a spectrum compression solution in the prior art;

FIG. 2 is a flowchart of a method for downlink compression of a nonstandard bandwidth of an LTE system according to Embodiment 1 of the present disclosure;

DETAILED DESCRIPTION

To make the objectives, technical solutions, and advantages of the embodiments of the present disclosure clearer, the following describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

FIG. 2 is a flowchart of a method for downlink compression of a nonstandard bandwidth of an LTE system according to Embodiment 1 of the present disclosure. As shown in FIG. 2, the method according to this embodiment may include the following steps:

Step 101: A base station shifts a center frequency of a baseband signal to a preset direction by a frequency change amount, where the frequency change amount is preset.

In this embodiment, the base station uses a nonstandard bandwidth of an LTE system, and a terminal uses a standard bandwidth of the LTE system, where the nonstandard bandwidth of the LTE system is less than the standard bandwidth of the LTE system. When the base station has data to be sent to the terminal, the base station shifts the center frequency of the baseband signal to the preset direction by the frequency change amount, where the frequency change amount is preset. That the base station shifts the center frequency of the baseband signal to the preset direction by the frequency change amount is specifically as follows: The base station adds the frequency change amount to the center frequency of the baseband signal to obtain the frequency-shifted baseband signal.

Figure 3:
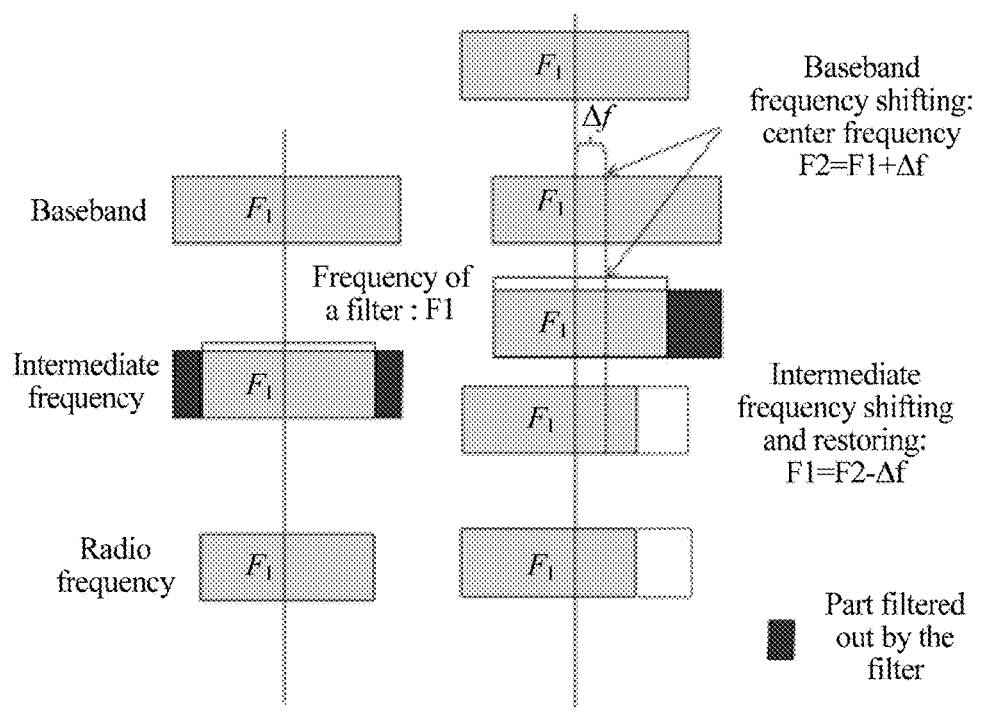
FIG. 3 is a schematic diagram of comparison between a process of downlink compression of a nonstandard bandwidth of an LTE system according to an embodiment of the present disclosure and that in the prior art.

FIG. 3 is a schematic diagram of comparison between a process of downlink compression of a nonstandard bandwidth of an LTE system according to an embodiment of the present disclosure and that in the prior art. Referring to FIG. 3, the left side of FIG. 3 shows a process of compressing a nonstandard bandwidth of an LTE system in the prior art, and the right side of FIG. 3 shows a process of compressing a nonstandard bandwidth of an LTE system according to this embodiment. In the prior art, a base station first performs frequency conversion processing on a baseband signal to obtain an intermediate frequency signal, and then uses a filter to filter the intermediate frequency signal. The filter symmetrically filters out leftmost and rightmost edge spectrums of the intermediate frequency signal. In this embodiment, a base station shifts a center frequency of a baseband signal first. It is assumed that the center frequency of the baseband signal is $F_1$, the center frequency $P_1$ of the baseband signal is shifted leftward by a frequency change amount $\Delta f$, and a center frequency of the frequency-shifted baseband signal is $F_2 = F_1 + \Delta f$. In the example shown in FIG. 3, the center frequency of the baseband signal is shifted leftward, that is, a left side of the center frequency is used as a preset direction; or certainly, a right side of the center frequency of the baseband signal may be used as a preset direction, and the center frequency of the baseband signal is shifted rightward by the frequency change amount. The preset direction of shifting the center frequency and the frequency change amount may be preconfigured by the base station or preconfigured manually.

In this embodiment, the frequency change amount may be preset by the base station according to a standard bandwidth of the LTE system and a nonstandard bandwidth that can be provided by an operator. Optionally, the frequency change amount is a size of N resource blocks (RB), where N is greater than 0. For example, the standard bandwidth of the LTE system is 5M, and the nonstandard bandwidth of the LTE system, which can be provided by the operator, is 4.6M. A value of N may be set to 0.5. If the nonstandard bandwidth of the LTE system is 3.8M, a value of N may be set to 1. Optionally, the frequency change amount may be a size of N guard bands of the standard bandwidth of the LTE system, where N is greater than 0. A guard band is set between frequencies in the LTE system.

Step 102: The base station filters the frequency-shifted baseband signal by using a filter, to filter out an edge signal of the frequency-shifted baseband signal on a side of the preset direction, where a center frequency of the filter is the same as the center frequency of the baseband signal, a bandwidth of the filter is a nonstandard bandwidth of an LTE system, and the nonstandard bandwidth of the LTE system is less than a standard bandwidth of the LTE system.

In this embodiment, the center frequency of the filter is the same as the center frequency of the baseband signal. By performing frequency shifting and then filtering on the baseband signal, the base station needs only to filter out an edge signal of the frequency-shifted baseband signal on a side of the preset direction, without filtering out an edge signal of the frequency-shifted baseband signal on an opposite side of the preset direction. As shown in FIG. 3, a black part on the right side of the frequency-shifted baseband signal indicates edge signals that are filtered out, and edge signals on the left side of the frequency-shifted baseband signal are complete and not filtered out. A center frequency of the filtered baseband signal is the same as the center frequency of the frequency-shifted baseband signal. Therefore, the center frequency of the filtered baseband signal is also $F_2$.

Step 103: The base station performs frequency conversion processing on the filtered baseband signal to obtain an intermediate frequency signal; and shifts a center frequency of the intermediate frequency signal to an opposite direction of the preset direction by the frequency change amount, where a center frequency of the frequency-shifted intermediate frequency signal is the same as the center frequency of the baseband signal.

That the base station performs frequency conversion processing on the filtered baseband signal to obtain the intermediate frequency signal may be specifically as follows: An intermediate frequency module in the base station performs frequency conversion processing on the filtered baseband signal, where the center frequency of the intermediate frequency signal is the same as the center frequency of the frequency-shifted baseband signal. After obtaining the intermediate frequency signal, the base station shifts the center frequency of the intermediate frequency signal to an opposite direction of the preset direction by the frequency change amount, so as to restore the center frequency of the intermediate frequency signal into the center frequency of the baseband signal. In this embodiment, by shifting the frequency twice, the center frequency of the intermediate frequency signal keeps the same as the center frequency of the baseband signal.

As shown in FIG. 3, the base station shifts the center frequency of the intermediate frequency signal leftward by the frequency change amount $\Delta f$. The center frequency of the frequency-shifted intermediate frequency signal is $F_3 = F_2 - \Delta f = F_1 + \Delta f - \Delta f = F_1$ which is the same as the center frequency $F_1$ of the baseband signal. It can be learned from FIG. 3 that in the prior art, edge signals on both sides of the intermediate frequency signal are filtered out symmetrically; in this embodiment, however, only an edge signal on one side of the intermediate frequency signal is filtered out, and an edge signal on the other side of the intermediate frequency signal is not filtered out. In the solution of the prior art, if an edge signal that is filtered out from edges on both sides of the intermediate frequency signal is not an integer multiple of RBs, an entire RB in which the filtered-out edge signal is located is unusable. For example, if 0.5 RB is filtered out from each of two sides of the intermediate frequency signal, 1 RB is unusable on each of two sides of the intermediate frequency signal, and radio resources of two RBs are wasted. In the solution of this embodiment, the center frequency of the baseband signal is shifted rightward by 0.5 RB, so that 1 RB is filtered out from a right edge of the intermediate frequency signal that is obtained after the frequency of the baseband signal is converted, and no RB is filtered out from a left edge of the intermediate frequency signal. According to the method in this embodiment, only 1 RB needs to be wasted. Therefore, compared with the prior art, according to the method in this embodiment, spectrum resources of 1 RB can be saved, thereby improving utilization of spectrum resources.

If no RB is filtered out from both sides of the intermediate frequency signal and only a guard band of a spectrum is filtered out, guard bands on both sides of the intermediate frequency signal are filtered out in the solution of the prior art. After the guard bands are filtered out, a system of a different standard causes great interference to both sides of the intermediate frequency signal in the LTE system. In the solution of this embodiment, however, a guard band on only one side of the intermediate frequency signal is filtered out, a guard band on the other side of the intermediate frequency signal is retained completely, and a system of a different standard causes great interference to the one side of the intermediate frequency signal in the LTE system, but causes little interference to the other side. Therefore, compared with the solution of the prior art, according to the solution of this embodiment, interference caused by the system of a different standard to the LTE system may further be reduced.

Figure 4:
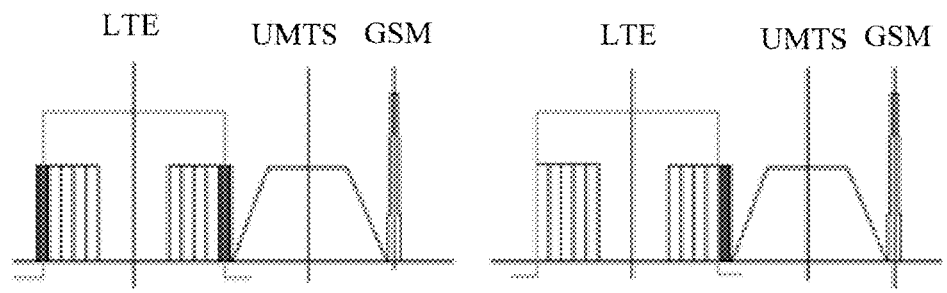
FIG. 4 is a schematic diagram of existing networking.

GUL networking is used as an example for description in the following. According to analysis, power spectrum density of GSM is greater than that of LTE by 14 dBm, and interference to the LTE is very strong in both uplink and downlink. In some networking scenarios, by using the method of this embodiment, interference caused by the system of a different standard to the LTE system can be reduced effectively. FIG. 4 is a schematic diagram of an existing networking. As shown in FIG. 4, an LTE system is located between a GSM system and a UMTS system. A technical solution in the prior art is to filter out a leftmost RB and a rightmost RB of an LTE spectrum, and after being filtered out, the leftmost RB of the LTE spectrum is provided for the GSM system, but the GSM system causes great interference to the LTE system.

In this embodiment, a center frequency of a spectrum of the LTE system is shifted leftward by one RB, so that an RB at the left edge of the spectrum of the LTE system is retained completely, and the RB at the left edge of the spectrum of the LTE system can be used by the LTE system. Spectrums of the GSM system are all located on the right side of the LTE system, and the spectrums of the GSM system are no longer adjacent to spectrums of the LTE system, and therefore, the GSM system does not cause any interference to the LTE system. In this networking mode, the center frequency of the spectrum of the LTE system is shifted leftward by one RB, so that an interval of one RB is reduced between the UMTS system and the LTE system, which increases interference caused by the UMTS system to the LTE system. However, the interference caused by the UMTS system to the LTE system is less than the interference caused by the GSM system to the LTE system. Therefore, even in a case of same utilization of spectrum resources, compared with the solution of the prior art, according to the solution of this embodiment, interference caused by the system of a different standard to the LTE system can also be reduced.

Step 104: The base station performs frequency conversion processing on the frequency-shifted intermediate frequency signal to obtain a radio frequency signal, and sends the radio frequency signal to a terminal, where a bandwidth of the radio frequency signal is the nonstandard bandwidth of the LTE.

In this embodiment, a base station filters a baseband signal by using a filter whose bandwidth is a nonstandard bandwidth of LTE, and filters out a signal outside the nonstandard bandwidth of LTE; and the base station may send a signal to a terminal by using the nonstandard bandwidth of LTE that can be provided by an operator. For example, the operator can provide only an LTE nonstandard bandwidth of 3M that falls within 1-4M, and a standard bandwidth of LTE is 5M, and therefore, the filter needs to filter out signals within bandwidths 0-1M and 4-5M. During final sending, the base station uses the LTE nonstandard bandwidth of 3M; during receiving, the terminal uses the LTE standard bandwidth of 5M for receiving; and the base station has no signal within bandwidths 0-1M and 4-5M. The base station also needs to send the nonstandard bandwidth of the LTE system to the terminal, so that the terminal sends data to the base station according to the nonstandard bandwidth of the LTE system.

In this embodiment, the base station shifts a center frequency of a baseband signal to a preset direction by a frequency change amount before filtering, and then filters the frequency-shifted baseband signal by using the filter, to filter out an edge signal of the frequency-shifted baseband signal on a side of the preset direction but without filtering out an edge signal of the baseband signal on an opposite side of the preset direction, where a bandwidth of the filter is the nonstandard bandwidth of the LTE system. In an intermediate frequency processing stage, a center frequency of the intermediate frequency signal is shifted to an opposite direction of the preset direction by the frequency change amount, to restore the center frequency of the intermediate frequency signal into the center frequency of the baseband signal. In this embodiment, by means of shifting the frequency twice, an edge spectrum on one side of data to be sent is filtered out, and an edge spectrum on the other side is retained completely, which not only can improve utilization of spectrums and but also can reduce interference caused by a system of a different standard to the LTE system.

Figure 5:
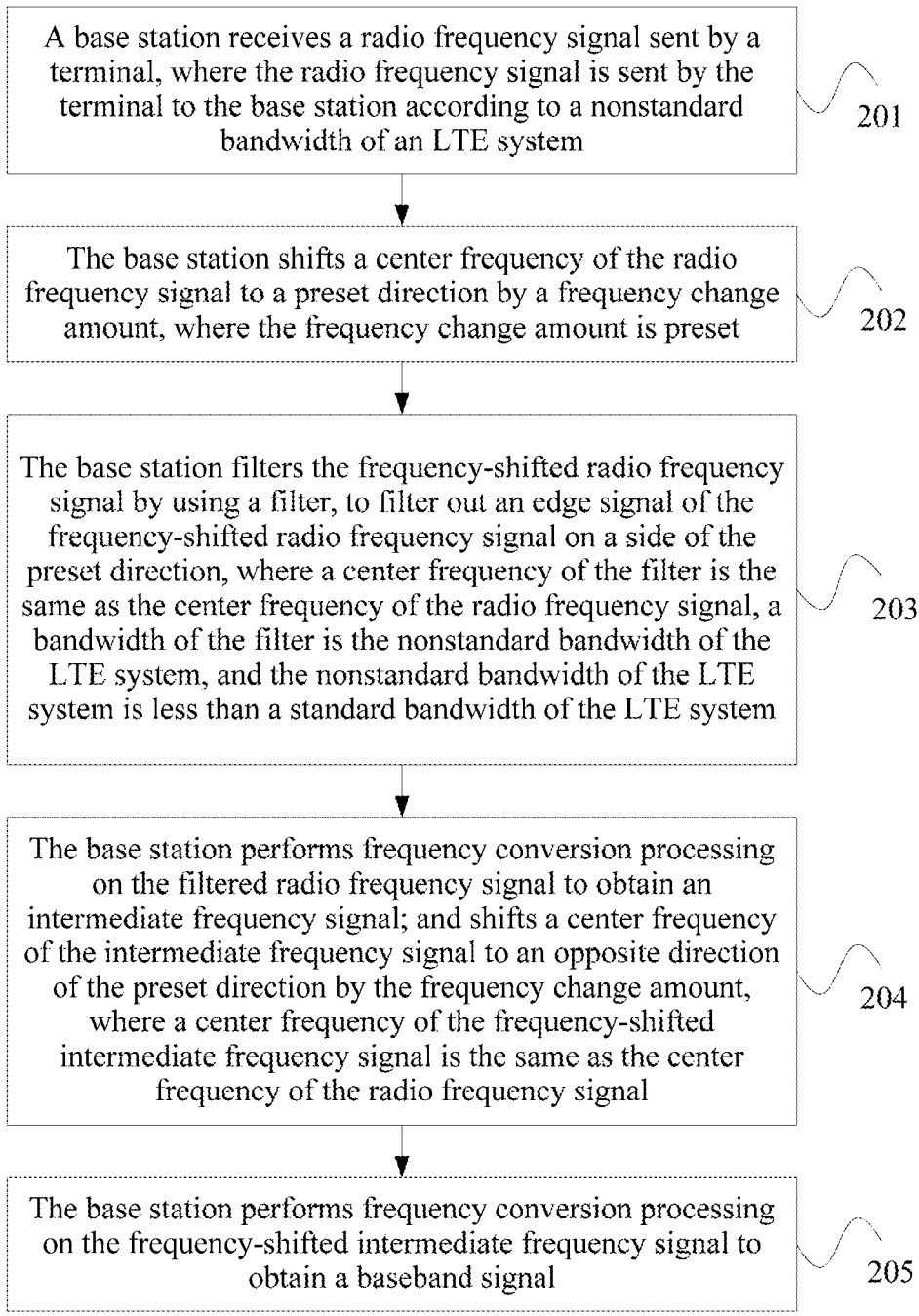
FIG. 5 is a flowchart of a method for uplink compression of a nonstandard bandwidth of an LTE system according to Embodiment 2 of the present disclosure.

Embodiment 1 is described from a perspective of sending downlink data, and Embodiment 2 of the present disclosure is described from a perspective of receiving uplink data. FIG. 5 is a flowchart of a method for uplink compression of a nonstandard bandwidth of an LTE system according to Embodiment 2 of the present disclosure. As shown in FIG. 5, the method provided in this embodiment may include the following steps:

Step 201: A base station receives a radio frequency signal sent by a terminal, where the radio frequency signal is sent by the terminal to the base station according to a nonstandard bandwidth of an LTE system.

In this embodiment, the base station uses the nonstandard bandwidth of the LTE system, and therefore, the base station sends the nonstandard bandwidth of the LTE system to the terminal. When the terminal has uplink data to be sent, because the base station cannot receive data outside the nonstandard bandwidth of the LTE system, the terminal can send the data to the base station over only the nonstandard bandwidth of the LTE system when sending the data. For example, a standard bandwidth of the LTE system is 0-5M, and the nonstandard bandwidth of the LTE system is 1-4M, and therefore, when sending the data, the terminal can use only the bandwidth 1-4M to send the data to the base station, and the terminal does not send any data over bandwidths 0-1M and 4-5M. For the terminal, the bandwidth used by the terminal to send the radio frequency signal is still 5M.

Step 202: The base station shifts a center frequency of the radio frequency signal to a preset direction by a frequency change amount, where the frequency change amount is preset.

The radio frequency signal received by the base station has the standard bandwidth of the LTE system, but the data of the terminal is sent over only the nonstandard bandwidth of the LTE system, and the base station shifts the center frequency of the radio frequency signal to the preset direction by the frequency change amount. Optionally, the frequency change amount is a size of N resource blocks, or the frequency change amount is a size of N guard bands of the standard bandwidth of the LTE system, where N is greater than 0.

Step 203: The base station filters the frequency-shifted radio frequency signal by using a filter, to filter out an edge signal of the frequency-shifted radio frequency signal on a side of the preset direction, where a center frequency of the filter is the same as the center frequency of the radio frequency signal, a bandwidth of the filter is the nonstandard bandwidth of the LTE system, and the nonstandard bandwidth of the LTE system is less than the standard bandwidth of the LTE system.

Step 204: The base station performs frequency conversion processing on the filtered radio frequency signal to obtain an intermediate frequency signal; and shifts a center frequency of the intermediate frequency signal to an opposite direction of the preset direction by the frequency change amount, where a center frequency of the frequency-shifted intermediate frequency signal is the same as the center frequency of the radio frequency signal.

Step 205: The base station performs frequency conversion processing on the frequency-shifted intermediate frequency signal to obtain a baseband signal.

It should be noted that the method according to this embodiment of the present disclosure may be applied to any frequency band.

Figure 6:
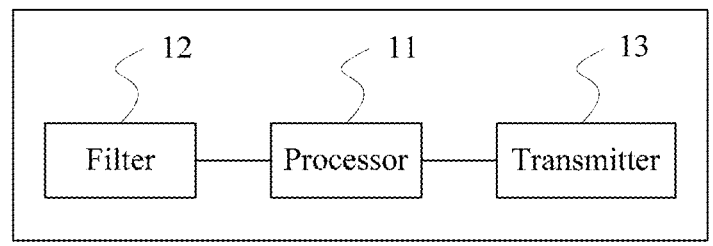
FIG. 6 is a schematic structural diagram of a base station according to Embodiment 3 of the present disclosure.

FIG. 6 is a schematic structural diagram of a base station according to Embodiment 3 of the present disclosure. As shown in FIG. 6, the base station provided in this embodiment includes at least one processor 11, a filter 12, and a transmitter 13. FIG. 6 shows only one processor 11.

The at least one processor 11 is configured to shift a center frequency of a baseband signal to a preset direction by a frequency change amount, where the frequency change amount is preconfigured.

The filter 12 is configured to filter the frequency-shifted baseband signal to filter out an edge signal of the frequency-shifted baseband signal on a side of the preset direction, where a center frequency of the filter is the same as the center frequency of the baseband signal, a bandwidth of the filter is a nonstandard bandwidth of a LTE system, and the nonstandard bandwidth of the LTE system is less than a standard bandwidth of the LTE system.

The at least one processor 11 is further configured to perform frequency conversion processing on the baseband signal filtered by the filter 12, to obtain an intermediate frequency signal; and shift a center frequency of the intermediate frequency signal to an opposite direction of the preset direction by the frequency change amount, where a center frequency of the frequency-shifted intermediate frequency signal is the same as the center frequency of the baseband signal.

The at least one processor 11 is further configured to perform frequency conversion processing on the frequency-shifted intermediate frequency signal to obtain a radio frequency signal.

The transmitter 13 is configured to send the radio frequency signal to a terminal, where a bandwidth of the radio frequency signal is the nonstandard bandwidth of the LTE.

It should be noted that when the base station includes only one processor 11, the same processor 11 may perform an operation of shifting the frequency of the baseband signal, an operation of converting the baseband signal into the intermediate frequency signal, and an operation of converting the intermediate frequency signal into the radio frequency signal. When the base station includes multiple processors 11, different processors 11 may separately perform the foregoing operations. For example, three processors 11 are included in total, and are separately configured to perform the operation of shifting the frequency of the baseband signal, the operation of converting the baseband signal into the intermediate frequency signal, and the operation of converting the intermediate frequency signal into the radio frequency signal.

Optionally, the frequency change amount is a size of N resource blocks, where N is greater than 0.

Optionally, the frequency change amount is a size of N guard bands of the standard bandwidth of the LTE system, where N is greater than 0.

Optionally, the transmitter 13 is further configured to send the nonstandard bandwidth of the LTE system to the terminal, so that the terminal sends data to the base station according to the nonstandard bandwidth of the LTE system.

The base station in this embodiment may be configured to execute the method in Embodiment 1, and specific implementation manners and technical effects are similar, and are not described herein again.

Figure 7:
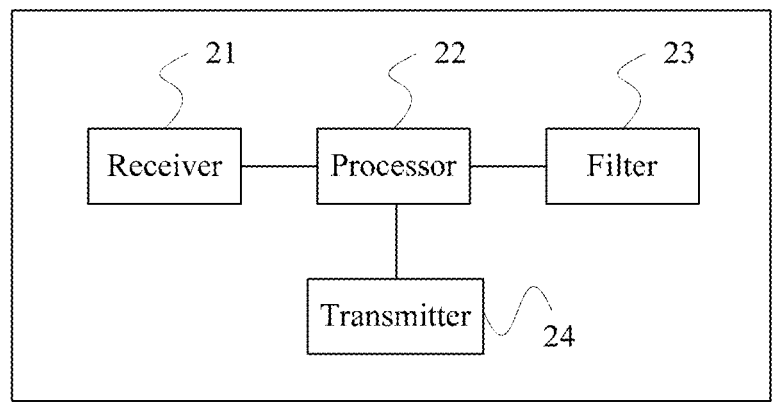
FIG. 7 is a schematic structural diagram of a base station according to Embodiment 4 of the present disclosure.

FIG. 7 is a schematic structural diagram of a base station according to Embodiment 4 of the present disclosure. As shown in FIG. 7, the base station provided in this embodiment includes a receiver 21, at least one processor 22, and a filter 23. FIG. 7 shows only one processor 22.

The receiver 21 is configured to receive a radio frequency signal sent by a terminal, where the radio frequency signal is sent by the terminal to the base station according to a nonstandard bandwidth of an LTE system.

The at least one processor 22 is configured to shift a center frequency of the radio frequency signal received by the receiver 21 to a preset direction by a frequency change amount, where the frequency change amount is preconfigured.

The filter 23 is configured to filter the frequency-shifted radio frequency signal to filter out an edge signal of the frequency-shifted radio frequency signal on a side of the preset direction, where a center frequency of the filter is the same as the center frequency of the radio frequency signal, a bandwidth of the filter is the nonstandard bandwidth of the LTE system, and the nonstandard bandwidth of the LTE system is less than a standard bandwidth of the LTE system.

The at least one processor 22 is further configured to perform frequency conversion processing on the radio frequency signal filtered by the filter 23, to obtain an intermediate frequency signal; and shift a center frequency of the intermediate frequency signal to an opposite direction of the preset direction by the frequency change amount, where a center frequency of the frequency-shifted intermediate frequency signal is the same as the center frequency of the radio frequency signal.

The at least one processor 22 is further configured to perform frequency conversion processing on the frequency-shifted intermediate frequency signal to obtain a baseband signal.

It should be noted that when the base station includes only one processor 22, the same processor 22 may perform an operation of shifting the frequency of the radio frequency signal, an operation of converting the radio frequency signal into the intermediate frequency signal, and an operation of converting the intermediate frequency signal into the baseband signal. When the base station includes multiple processors 22, different processors 22 may separately perform the foregoing operations. For example, three processors 22 are included in total, and separately configured to perform the operation of shifting the frequency of the radio frequency signal, the operation of converting the radio frequency signal into the intermediate frequency signal, and the operation of converting the intermediate frequency signal into the baseband signal.

Optionally, the frequency change amount is a size of N resource blocks, where N is greater than 0.

Optionally, the frequency change amount is a size of N guard bands of the standard bandwidth of the LTE system, where N is greater than 0.

Further, the base station further includes: a transmitter 24, configured to send the nonstandard bandwidth of the LTE system to the terminal, so that the terminal sends data to the base station according to the nonstandard bandwidth of the LTE system.

The base station in this embodiment may be configured to execute the method in Embodiment 2, and specific implementation manners and technical effects are similar, and are not described herein again.

Figure 8:
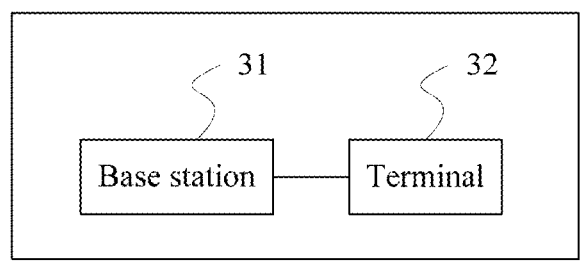
FIG. 8 is a schematic structural diagram of a communications system according to Embodiment 5 of the present disclosure.

FIG. 8 is a schematic structural diagram of a communications system according to Embodiment 5 of the present disclosure. As shown in FIG. 8, the communications system provided in this embodiment includes a base station 31 and a terminal 32. The base station 31 is configured to execute the method according to Embodiment 1. The terminal 32 is configured to receive a radio frequency signal sent by the base station 31, where a bandwidth of the radio frequency signal is a nonstandard bandwidth of an LTE system. For a specific implementation manner of this embodiment, reference may be made to the description in Embodiment 1, and details are not described herein again.

Embodiment 6 of the present disclosure provides a communications system. For a schematic structural diagram of the communications system provided in this embodiment, reference may be made to FIG. 8. In this embodiment, the terminal 32 is configured to send a radio frequency signal to a base station, where the radio frequency signal is sent by the terminal 32 to the base station 31 according to the nonstandard bandwidth of the LTE system. The base station 31 is configured to execute the method according to Embodiment 2. For a specific implementation manner of this embodiment, reference may be made to the description in Embodiment 2, and details are not described herein again.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present disclosure.

What is claimed is:

1. A base station, comprising:
at least one processor, configured to shift a center frequency of a baseband signal to a preset direction by a preconfigured frequency change amount;
a filter, configured to filter the frequency-shifted baseband signal to filter out an edge signal of the frequency-shifted baseband signal on a side of the preset direction, wherein a center frequency of the filter is the same as the center frequency of the baseband signal, and a bandwidth of the filter is a nonstandard bandwidth of a long term evolution (LTE) system which is less than a standard bandwidth of the LTE system,
wherein the at least one processor is further configured to:
perform frequency conversion processing on the baseband signal filtered by the filter, to obtain an intermediate frequency signal,
shift a center frequency of the intermediate frequency signal to an opposite direction of the preset direction by the preconfigured frequency change amount, wherein a center frequency of the frequency-shifted intermediate frequency signal is the same as the center frequency of the baseband signal, and
perform frequency conversion processing on the frequency-shifted intermediate frequency signal to obtain a radio frequency signal; and
a transmitter, configured to send the radio frequency signal to a terminal, wherein a bandwidth of the radio frequency signal is the nonstandard bandwidth of the LTE system.

2. The base station according to claim 1, wherein the preconfigured frequency change amount is a size of N resource blocks, wherein N is greater than 0.

3. The base station according to claim 1, wherein the preconfigured frequency change amount is a size of N resource blocks of the standard bandwidth of the LTE system, wherein N is greater than 0.

4. The base station according to claim 1, wherein the transmitter is further configured to:
send the nonstandard bandwidth of the LTE system to the terminal for enabling the terminal to send data to the base station according to the nonstandard bandwidth of the LTE system.

5. A base station, comprising:
a receiver, configured to receive a radio frequency signal sent by a terminal to the base station according to a nonstandard bandwidth of a long term evolution (LTE) system;
at least one processor, configured to shift a center frequency of the received radio frequency signal to a preset direction by a preconfigured frequency change amount; and
a filter, configured to filter the frequency-shifted radio frequency signal to filter out an edge signal of the frequency-shifted radio frequency signal on a side of the preset direction, wherein a center frequency of the filter is the same as the center frequency of the radio frequency signal, and a bandwidth of the filter is the nonstandard bandwidth of the LTE system which is less than a standard bandwidth of the LTE system,
wherein the at least one processor is further configured to:
perform frequency conversion processing on the radio frequency signal filtered by the filter, to obtain an intermediate frequency signal,
shift a center frequency of the intermediate frequency signal to an opposite direction of the preset direction by the preconfigured frequency change amount, wherein a center frequency of the frequency-shifted intermediate frequency signal is the same as the center frequency of the radio frequency signal, and
perform frequency conversion processing on the frequency-shifted intermediate frequency signal to obtain a baseband signal.

6. The base station according to claim 5, wherein the preconfigured frequency change amount is a size of N resource blocks, wherein N is greater than 0.

7. The base station according to claim 5, wherein the preconfigured frequency change amount is a size of N guard bands of the standard bandwidth of the LTE system, wherein N is greater than 0.

8. The base station according to claim 5, further comprising:
a transmitter, configured to send the nonstandard bandwidth of the LTE system to the terminal for enabling the terminal to send data to the base station according to the nonstandard bandwidth of the LTE system.

9. A method for downlink compression of a nonstandard bandwidth of a long term evolution (LTE) system, the method comprising:
shifting, by a processor of a base station, a center frequency of a baseband signal to a preset direction by a preconfigured frequency change amount;
filtering, by a filter of the base station, the frequency-shifted baseband signal, to filter out an edge signal of the frequency-shifted baseband signal on a side of the preset direction, wherein a center frequency of the filter is the same as the center frequency of the baseband signal, and a bandwidth of the filter is the nonstandard bandwidth of the LTE system which is less than a standard bandwidth of the LTE system;
performing, by the processor of the base station, frequency conversion processing on the filtered baseband signal to obtain an intermediate frequency signal;
shifting, by the processor of the base station, a center frequency of the intermediate frequency signal to an opposite direction of the preset direction by the preconfigured frequency change amount, wherein a center frequency of the frequency-shifted intermediate frequency signal is the same as the center frequency of the baseband signal;
performing, by the processor of the base station, frequency conversion processing on the frequency-shifted intermediate frequency signal to obtain a radio frequency signal; and
sending, by a transmitter of the base station, the radio frequency signal to a terminal, wherein a bandwidth of the radio frequency signal is the nonstandard bandwidth of the LTE system.

10. The method according to claim 9, wherein the preconfigured frequency change amount is a size of N resource blocks, wherein N is greater than 0.

11. The method according to claim 9, wherein the preconfigured frequency change amount is a size of N guard bands of the standard bandwidth of the LTE system, wherein N is greater than 0.

12. The method according to claim 9, further comprising:
sending, by the transmitter of the base station, the nonstandard bandwidth of the LTE system to the terminal for enabling the terminal to send data to the base station according to the nonstandard bandwidth of the LTE system.

13. A method for uplink compression of a nonstandard bandwidth of a long term evolution (LTE) system, the method comprising:
receiving, by a receiver of a base station, a radio frequency signal sent by a terminal to the base station according to the nonstandard bandwidth of the LTE system;
shifting, by a processor of the base station, a center frequency of the radio frequency signal to a preset direction by a preconfigured frequency change amount;
filtering, by a filter of the base station, the frequency-shifted radio frequency signal, to filter out an edge signal of the frequency-shifted radio frequency signal on a side of the preset direction, wherein a center frequency of the filter is the same as the center frequency of the radio frequency signal, and a bandwidth of the filter is the nonstandard bandwidth of the LTE system which is less than a standard bandwidth of the LTE system;
performing, by the processor of the base station, frequency conversion processing on the filtered radio frequency signal to obtain an intermediate frequency signal;
shifting, by the processor of the base station, a center frequency of the intermediate frequency signal to an opposite direction of the preset direction by the preconfigured frequency change amount, wherein a center frequency of the frequency-shifted intermediate frequency signal is the same as the center frequency of the radio frequency signal; and
performing, by the processor of the base station, frequency conversion processing on the frequency-shifted intermediate frequency signal to obtain a baseband signal.

14. The method according to claim 13, wherein the preconfigured frequency change amount is a size of N resource blocks, wherein N is greater than 0.

15. The method according to claim 13, wherein the preconfigured frequency change amount is a size of N guard bands of the standard bandwidth of the LTE system, wherein N is greater than 0.

16. The method according to claim 13, further comprising:
sending, by a transmitter of the base station, the nonstandard bandwidth of the LTE system to the terminal for enabling the terminal to send data to the base station according to the nonstandard bandwidth of the LTE system.

* * * * *

UNITED STATES PATENT AND TRADEMARK OFFICE
CERTIFICATE OF CORRECTION

PATENT NO. : 10,440,608 B2
APPLICATION NO. : 15/812984
DATED : October 8, 2019
INVENTOR(S) : Ye et al.

Page 1 of 1

It is certified that error appears in the above-identified patent and that said Letters Patent is hereby corrected as shown below:

On the Title Page

Item (57), Abstract, Line 3: "nonstandard bandwidth of an LTE system. Abase station" should read -- nonstandard bandwidth of an LTE system. A base station --.

Item (57), Abstract, Line 6: "outside the nonstandard bandwidth of LTE; and the base" should read -- outside of the nonstandard bandwidth of LTE; and the base --.

Signed and Sealed this
Twenty-third Day of June, 2020

Andrei Iancu
*Director of the United States Patent and Trademark Office*